United States Patent
Hofer

(10) Patent No.: US 8,117,905 B2
(45) Date of Patent: Feb. 21, 2012

(54) TEST BENCH CONDITIONING SYSTEM FOR A WORKING FLUID, AND A DEVICE FOR OPERATING A TEST BENCH CONDITION SYSTEM OF THIS TYPE

(75) Inventor: Michael Hofer, Bruck An Der Mur (AT)

(73) Assignee: AVL List GmbH, Graz (AT)

( * ) Notice: Subject to any disclaimer, the term of this patent is extended or adjusted under 35 U.S.C. 154(b) by 58 days.

(21) Appl. No.: 12/588,813

(22) Filed: Oct. 28, 2009

(65) Prior Publication Data

US 2010/0116040 A1    May 13, 2010

(30) Foreign Application Priority Data

Oct. 30, 2008  (AT) ................. GM 621/2008

(51) Int. Cl.
*G01M 15/04* (2006.01)
(52) U.S. Cl. .................................. 73/114.68
(58) Field of Classification Search ............... 73/114.68, 73/114.56
See application file for complete search history.

(56) References Cited

U.S. PATENT DOCUMENTS

| | | | | |
|---|---|---|---|---|
| 2,188,172 | A * | 1/1940 | Brehob | 123/196 AB |
| 5,915,343 | A | 6/1999 | Zenobi | |
| 6,427,640 | B1 * | 8/2002 | Hickey et al. | 123/41.31 |
| 6,678,628 | B2 * | 1/2004 | Ryan et al. | 702/132 |
| 7,168,398 | B2 * | 1/2007 | Ap et al. | 123/41.1 |
| 7,699,028 | B2 * | 4/2010 | Guerrero et al. | 123/41.29 |
| 7,748,262 | B2 * | 7/2010 | Reginaldo et al. | 73/114.68 |
| 2002/0128107 | A1 * | 9/2002 | Wakayama | 475/161 |
| 2005/0000473 | A1 * | 1/2005 | Ap et al. | 123/41.1 |
| 2010/0089170 | A1 * | 4/2010 | Reginaldo et al. | 73/861.11 |

FOREIGN PATENT DOCUMENTS

| | | |
|---|---|---|
| FR | 2909713 | 6/2008 |
| JP | 5935609 | 3/1984 |
| JP | 2005140654 | 6/2005 |
| JP | 2008128809 | 6/2008 |

OTHER PUBLICATIONS

English Abstract of FR 2909713.
English Abstract of JP2005140654.
English Abstract of JP2008128809.

* cited by examiner

*Primary Examiner* — Freddie Kirkland, III
(74) *Attorney, Agent, or Firm* — Dykema Gossett PLLC

(57) ABSTRACT

A test bench conditioning system for a working fluid of a machine located on the test bench includes at least one pump (3) for circulating the working fluid, a heat exchanger (4) for cooling the working fluid coming from the discharge line (1) of the machine and a heating device (5) for the working fluid fed into the supply line (2) to the machine and a mixing valve (6). Furthermore, a bypass (8) that can be shut off between the discharge line (1) and the supply line (2) can be provided. Setting a temperature profile for the working fluid is possible via a control device. In order to render possible an optimum simulation of a real temperature profile of an operating fluid of a machine with the slightest deviations for the predetermined profile, a connecting line (10) with a control valve (11) leads to the discharge line (1) in front of the mixing valve (6), which opens into this discharge line (1) in front of the pump (3).

5 Claims, 2 Drawing Sheets

TEST BENCH CONDITIONING SYSTEM FOR A WORKING FLUID, AND A DEVICE FOR OPERATING A TEST BENCH CONDITION SYSTEM OF THIS TYPE

BACKGROUND OF THE INVENTION

1. Field of the Invention

The invention relates to a test bench conditioning system for a working fluid of a machine located on the test bench, in particular for the coolant of the machine, wherein the conditioning system contains at least one pump for circulating the working fluid, a heat exchanger for cooling the working fluid coming from the discharge line of the machine and a heating device for the working fluid fed into the supply line to the machine and a mixing valve, with a bypass that can be shut off between the discharge line and the supply line, and a control device for setting a temperature profile for the working fluid, and a device for operating a test bench conditioning system of this type.

2. The Prior Art

The cooling forced by the airstream in the vehicle, whether via the cooling water or other operating fluids, such as, for example the lubricants, must be replaced on the test bench by water heat exchangers. To compensate for the additional flow resistance in the heat exchanger, circulating pumps for the media to be cooled are provided, the heat input of which must also be taken into consideration. The operating fluids can be conditioned via coolers, heating registers, various units, measuring elements and control elements in order to reproduce the temperature profile occurring in real operation.

Usually the distribution of the operating fluid conducted via coolers and/or heating registers is set via a control loop in order to reproduce as precisely as possible the temperature profile known from driving tests, but this is not feasible due to the response times of the units and the dead times in the system.

The object of the present invention was therefore a test bench conditioning system and a device for operating a system of this type, with which an optimum simulation of a real temperature profile of an operating fluid of a machine is possible with the slightest deviations from the preset profile.

SUMMARY OF THE INVENTION

To attain this object, the conditioning system is characterized in that a connecting line with a control valve leads to the discharge line in front of the mixing valve and opens into this discharge line in front of the pump. Through this connecting line the temperature control is divided into three control loops that are independent per se, which are separately responsible for heated operating fluid, for cooled operating fluid and for the mixture of these two proportions. A predetermined temperature of the mixed operating fluids can be adjusted much more quickly via the mixing of hot and cold operating fluids in different proportions, than would be possible by heating or cooling alone. The device-related delays in the heating register or cooler are avoided by this approach.

According to one exemplary embodiment of the invention, the system is further characterized in that a bypass line is provided in the coolant circuit of the heat exchanger, which bypass line leads from the supply line of the coolant to the discharge line thereof, and a mixing valve for adjusting the quantity of the bypass flow. Through this feature the cooling circuit can be regulated more precisely and more quickly to the desired temperature of the cooled operating fluid.

Another embodiment of the invention provides that the branch and the opening of the bypass that can be shut off between the discharge line and the supply line of the machine are closer to the machine than in the case of the system components belonging to the heating device or to the heat exchanger.

To attain the object, the device mentioned at the outset is characterized according to the invention in that a temperature profile is stored in the control device and the control device controls the mixing valve in the bypass line of the heat exchanger and the control valve in the connecting line parallel to the heating device such that a partial flow with a temperature profile above the current desired temperature and a partial flow with a temperature below the current desired temperature is fed to the mixing valve for the working fluid at any time and that the control device activates the mixing valve for the working fluid such that a total flow is mixed from the two partial flows with precisely the current desired temperature.

The invention is described in more detail below based on the attached drawings.

DETAILED DESCRIPTION OF THE PREFERRED EMBODIMENT

Figure 1:
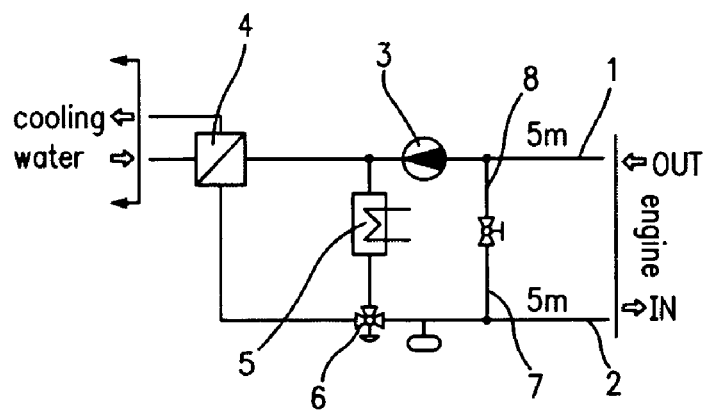
FIG. 1 shows a conventional system according to the prior art.

The operating fluid circulating in the machine, preferably cooling water, but also lubricating oil or the like, is drawn off from the machine via a discharge line 1 and fed via a supply line 2, after conditioning, to the machine again, for example an internal combustion engine. The length of the discharge line or supply line 1, 2 up to the first apparatus is typically approx. 5 meters. The condition system has at least one pump 3 for the circulation of the working fluid. Usually both a heat exchanger 4 for cooling the working fluid coming from the discharge line 1 of the machine and a heating device 5 for the working fluid fed into the supply line 2 to the machine as well as a mixing valve 6 are provided. Advantageously, a bypass 8, which can be shut off between the discharge line 1 and supply line 2 by means of the valve 7, is often provided directly in front of the pump 3 and behind the mixing valve 6, respectively opening in the immediate vicinity of these components. The control device for setting a temperature profile for the working fluid is not shown in the drawing figures.

Figure 2:
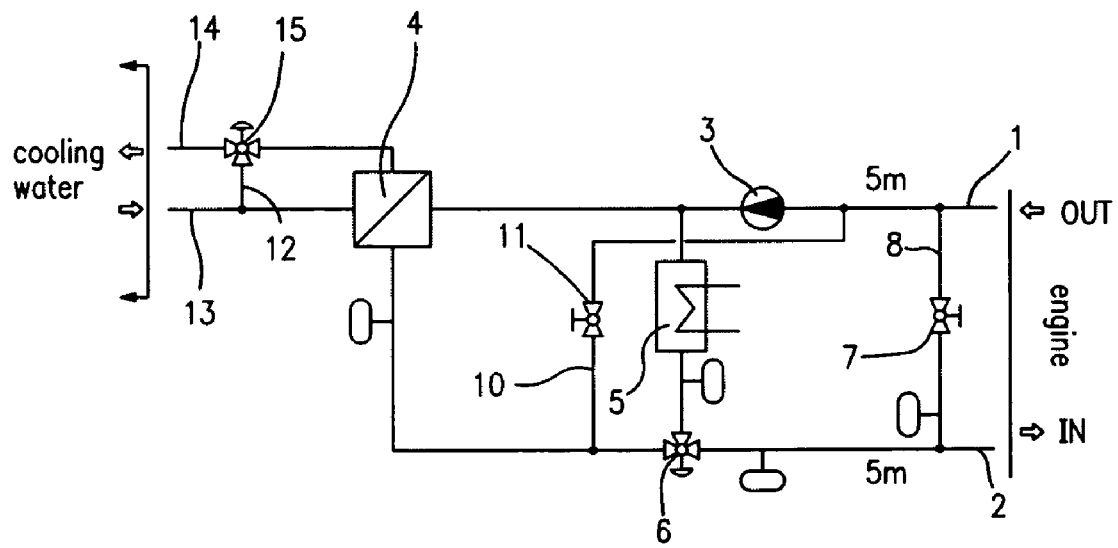
FIG. 2 is a representation of the system according to the invention.

As fundamental differences to the conventional systems, the exemplary embodiment of a conditioning system for a working fluid according to the invention shown in FIG. 2 has a connecting line 10, which goes out in front of the mixing valve 6, i.e., on the side of this mixing valve 6 facing away from the machine, and opens into the discharge line 1 in front of the pump 3, i.e., between this pump 3 and the machine. A control valve 11 is inserted in the connecting line 10. Through the connecting line 10 the temperature control is divided into three control loops that are independent per se, which are separately responsible for heated operating fluid, for cooled operating fluid and for the mixing of these two proportions.

Preferably, the branch and the opening of the bypass 10, which can be shut off between the discharge line 1 and the supply line 3 of the machine, are positioned closer to the machine than with the system components belonging to the heating device 5 or to the heat exchanger 4.

In the coolant circuit of the heat exchanger 4 a bypass line 12 can advantageously be provided from the supply line 13 of the coolant to the discharge line 14 thereof, in which bypass line 12 a mixing valve 15 is provided for setting the quantity of the bypass flow, in order to be able to adjust the cooling circuit more exactly and more quickly to the desired temperature of the cooled operating fluid.

In order to be able to run through preset temperature profiles very precisely and quickly, a temperature profile is stored advantageously in the control device of the conditioning system and the control device actuates the possible mixing valve 15 in the bypass line 12 of the heat exchanger 4 and the control valve 11 in the connecting line 10 parallel to the heating device 5 such that a partial flow W with a temperature lying above the current desired temperature S according to the temperature profile and a partial flow K with a temperature lying below the current desired temperature S is fed at any time to the mixing valve 6 for the working fluid. Furthermore, the control device actuates the mixing valve 6 for the working fluid such that a total flow with precisely the current desired temperature S is mixed from the two partial flows W, K.

Figure 3:
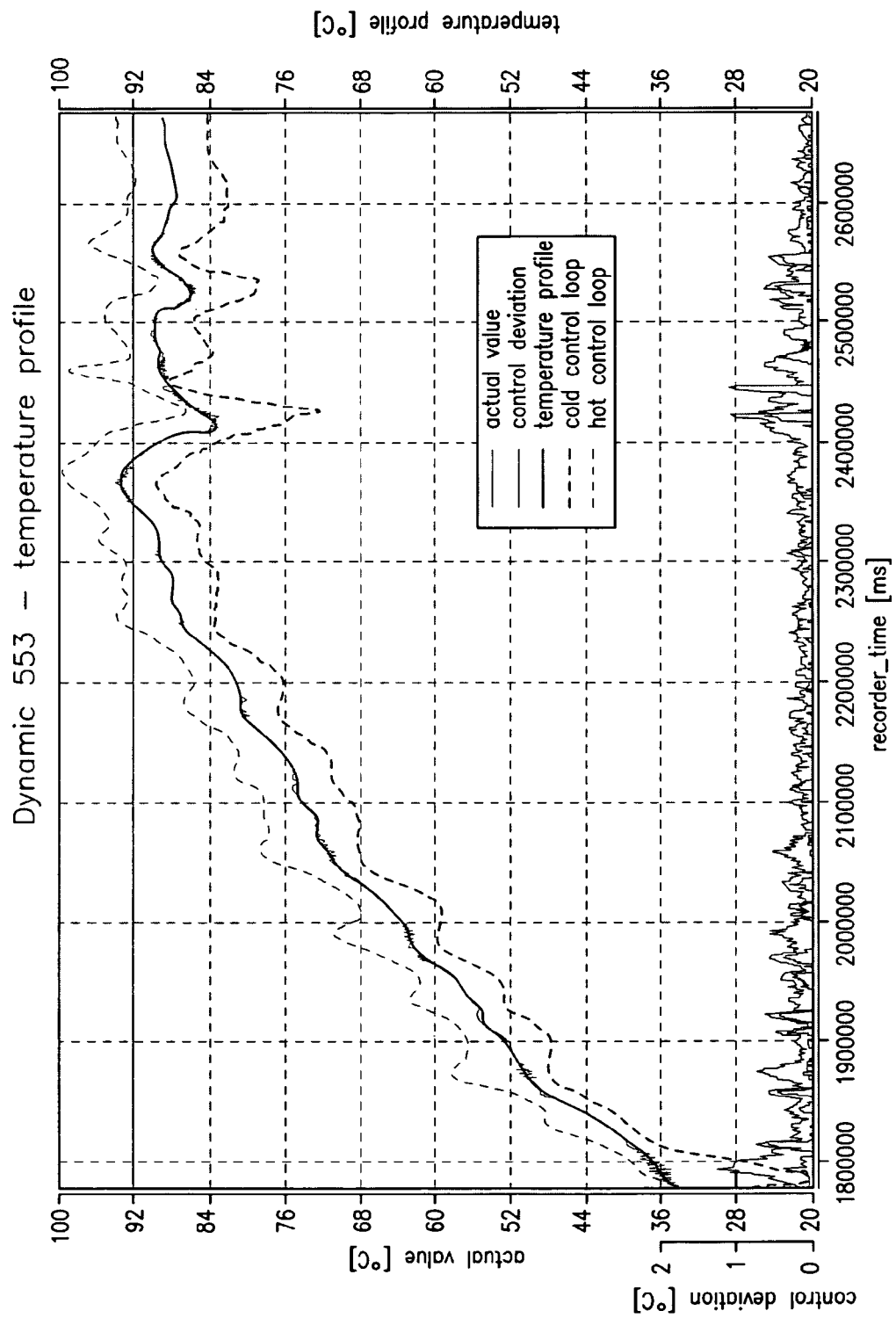
FIG. 3 shows a diagram of the temperature profiles of the partial flows and the conditioned operating fluid.

As is clearly shown by the diagram of FIG. 3, a desired temperature S of the mixed operating fluid preset by the control device can be adjusted much more quickly and also more precisely via this mixture of hot W and cold operating fluid K in different proportions, than would be possible through heating or cooling alone. The device-related delays in the heating register 5 or cooler 4 are avoided by this approach.

The invention claimed is:

1. A test bench conditioning system for a working fluid of a machine located on the test bench, wherein the conditioning system contains at least one pump (3) for circulating the working fluid, a heat exchanger (4) for cooling the working fluid coming from a discharge line (1) of the machine, a supply line (2) for supplying to the machine the working fluid coming from the heat exchanger (4), a heating device (5) for the working fluid positioned in a line connecting the discharge line (1) and the supply line (2) and in parallel to the heat exchanger (4), whereby the working fluid from the heating device (5) is fed into the supply line (2) to the machine via a mixing valve (6), with a bypass (8) that can be shut off between the discharge line (1) and the supply line (2), a control device for setting a temperature profile for the working fluid, said test bench conditioning system comprising moreover a connecting line (10) with a control valve (11), said connecting line (10) leading from the supply line (2) in front of the mixing valve (6) to the discharge line (1) in front of the pump (3).

2. The test bench conditioning system according to claim 1, including a bypass line (12) in the coolant circuit of the heat exchanger (4) that leads from a supply (13) line of the coolant to the discharge line (14) thereof, and a mixing valve (15) for adjusting the quantity of the bypass flow.

3. The test bench conditioning system according to claim 1, wherein the connecting line (10) between the discharge line (1) and the supply line (2) of the machine opens into the discharge line (1) closer to the machine than any other components belonging to the heating device (5) or to the heat exchanger (4).

4. A method for operating a test bench conditioning system for a working fluid according to claim 1, wherein a temperature profile with a current desired temperature for the working fluid for consecutive points of time is stored in a control device and the control device controls the mixing valve (15) in the bypass line (12) of the heat exchanger (4) and the control valve (11) in the connecting line (10) parallel to the heating device (5) such that a partial flow (W) with a temperature profile above said current desired temperature (S) and a partial flow (K) with a temperature below said current desired temperature (S) is fed to the mixing valve (6) for the working fluid at any time and that the control device activates the mixing valve (6) for the working fluid such that a total flow is mixed from the two partial flows (W, K) with precisely said current desired temperature (S) for the working fluid fed to the machine.

5. The test bench conditioning system according to claim 1, wherein the working fluid of the machine is the coolant of the machine.

* * * * *